Nov. 6, 1928.  
C. WEAR  
ART OF BAKING  
Filed Nov. 21, 1927
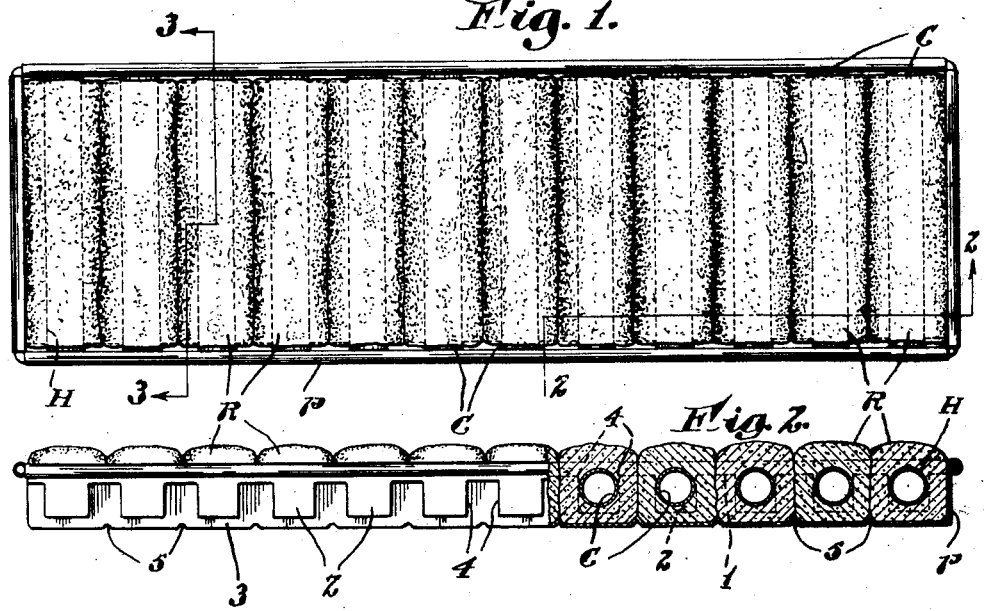
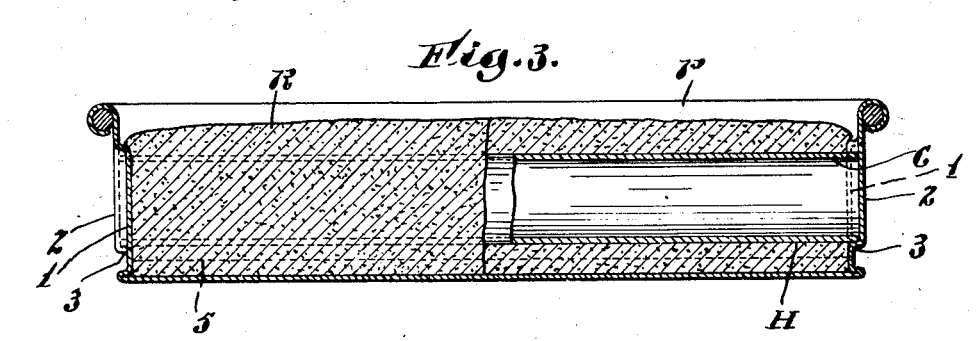
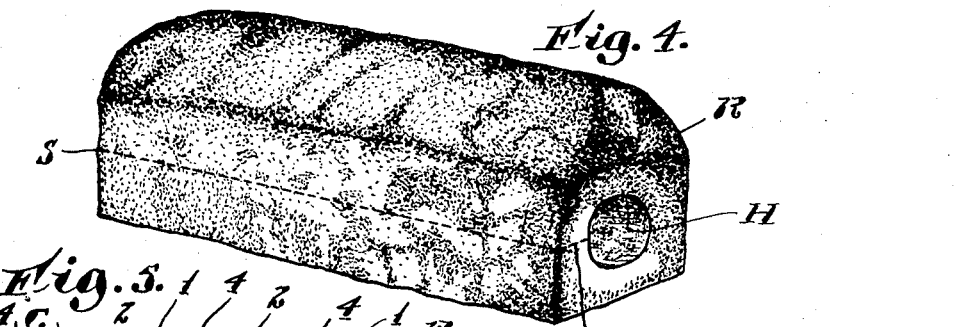
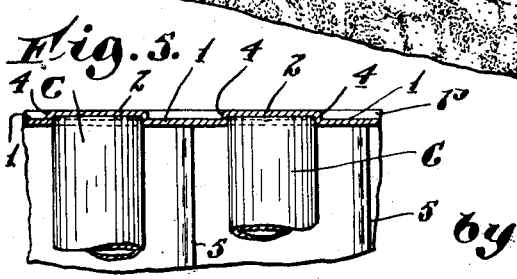
Inventor  
Charles Wear  
Geo. B. Rawlings  
Attorney Patented Nov. 6, 1928.

1,690,882

UNITED STATES PATENT OFFICE.

CHARLES WEAR, OF WALTHAM, MASSACHUSETTS, ASSIGNOR OF ONE-HALF TO JOSEPH POLLAK.

ART OF BAKING.

Application filed November 21, 1927. Serial No. 234,683.

The familiar Frankfort sandwich is a roll or loaf which is split and sometimes buttered, to receive a Frankfort or other edible filling. The Frankfort or other edible filling is placed within the split of the roll or loaf and the roll or loaf closed thereon. So dispensed, it is difficult to close the upper and lower sections of the split roll or loaf in convenient form for handling or to prevent moving or slipping of the Frankfort or other edible filling therefrom, particularly, where as in the case of a Frankfort, the Frankfort has assumed a curving form during boiling or frying and hence does not lie evenly between the sections of the roll or loaf.

It has been proposed heretofore to form the roll or loaf with a longitudinally extending opening or pocket within which the Frankfort or other edible filling could be inserted, and my present invention relates in general to a novel method of and apparatus for baking such a roll or loaf, and to the resultant product of such method and apparatus.

The method of practicing my invention, together with suitable apparatus for carrying out my method, and the resultant product of the method, is described and shown in the accompanying specification and drawings, and the characteristic features of novelty are particularly pointed out in the appended claims.

In the drawings:

Fig. 1 is a plan view of apparatus for the practice of my invention, such apparatus involving primarily a baking pan of conventional size and shape but of special construction.

Fig. 2 is a side elevation, partly in section of Fig. 1, the sectionalized showing being carried through that part of the disclosure of Fig. 1 indicated by the section line 2—2 in Fig. 1.

Fig. 3 is a cross section on the line 3—3 of Fig. 1.

Fig. 4 is a perspective view of one of the rolls baked in the pan shown in Figs. 1 to 3, the Frankfort or other edible filling not as yet having been inserted, but the line of split on which the roll will be cut to permit insertion of the Frankfort or other edible filling into the hollow interior of the roll being indicated by the dotted line S—S in said figure, and Fig. 5 is a fragmentary plan section particularly illustrating the socket construction of the pan walls, which sockets receive and correctly space the removable hole-forming cores on which the individual rolls are baked, and also are designed to allow the cores to rise vertically therein during the process of baking.

For purposes of illustration, I have shown my invention in connection with a Frankfort roll, but it will be understood that this showing is illustrative rather than limiting, and that the principles of my invention apply to bakery products other than rolls, as buns, biscuits, bread loaves, or the like, and to edible fillings other than Frankforts.

My method involves essentially the use of a plurality of removable and interchangeable cores C of suitable shape, size and material about which the individual pieces of dough which are to be baked to form the ultimate product, as a roll or loaf with an internal longitudinally extending recess or pocket, are initially covered, laid, or encased. When so prepared, the dough-covered cores are inserted in a baking pan P of conventional size, shape, and material, but of special construction so as removably to receive and properly to space the cores, and exposed to baking heat in the usual manner, but for a somewhat shorter time than would be necessary to bake rolls of equivalent ultimate size if of solid rather than hollow form. This saving is due to the fact that the hollow form of roll or loaf involves not only a lesser quantity of dough, as compared with a solid roll of the same external dimensions, but due to the physical presence of the core through the center of the roll as it is baked, some of the baking heat is conducted by said metal core into the interior of the roll, thus resulting in a better baked article in that the roll is baked both inside and outside.

When baking is completed, the rolls R or loaves are removed from the pan as a group, and the cores withdrawn therefrom. The ultimate product is the roll shown in Fig. 4, in which the hole or pocket H extends longitudinally from end to end of the roll or loaf. As delivered to the Frankfort vender, however, the rolls are preferably, but not necessarily, in group form, as in dozen lots, as is customary in the trade, and the vender breaks off the rolls, as desired, splits them along the indicated line of slit S—S in Fig. 4, and inserts the Frankfort or other filling laterally, rather than endwise, into the hollow interior or pocket H of the roll.

The apparatus for the practice of my invention consists of a baking pan of conventional shape but specially constructed removably to receive and freely to retain the detachable and interchangeable cores C, which cores themselves may be either tubular or solid and of any suitable material or shape, and as here shown are simple round metal tubes.

The opposite side walls 1 of the pan are provided with spaced alined sockets 2 which may be conveniently formed by pressing out the metal of the pan walls, as shown in Fig. 5, as a plurality of equidistantly spaced indents of a size and shape freely to receive the ends of the cores C. These sockets are open at their upper ends, as best shown in Fig. 2, and at their lower ends present seats in the form of horizontal supporting shoulders 3 (Fig. 3) upon which the cores originally rest when laid from above into the sockets, the vertical side edges 4 (Fig. 5) of the sockets guiding the cores onto said shoulders or seats when the cores are laid in the sockets.

By forming the sockets of a size slightly larger than the diameter of the cores and by leaving the upper ends of the sockets open, the cores are free to lift somewhat as the dough rises in the baking process. This action has been illustrated in the sectional showing of Fig. 2 wherein the cores are represented as having been lifted in the sockets slightly away from their seats 3 during the baking process.

In order to assist and insure proper separation of the individual rolls when baked, the bottom wall of the pan is provided with a spaced series of transverse ribs 5 preferably of inverted V-form. The internal baking forms a crust within the roll which insures that the opening or pocket H will be self-sustaining as to form, that is to say, the roll will not cave in at the center due to its hollow interior.

Various modifications in method and apparatus may obviously be resorted to without departing from the spirit and scope of my invention if within the limits of the appended claims.

What I therefore claim and desire to secure by Letters Patent is:

1. In the method of baking an article in the form of a roll or loaf having formed therein during the process of baking a longitudinally extending opening adapted to receive an edible filling, as a Frankfort, the steps which consist in forming a piece of dough around a core, in removably supporting such core with the adhering dough thereon within a baking pan, and in such relation to the pan walls as to allow the cores and dough adhering thereon to rise vertically away from the pan bottom in a straight line upward lifting movement when exposed to baking heat, in exposing the same to baking heat whereby to bake the roll or loaf both inside and out, in removing the core with the baked roll or loaf thereon from the pan, and in finally withdrawing the core from the baked roll or loaf.

2. In the method of baking articles in the form of rolls or loaves each having formed therein during the process of baking a longitudinally extending opening adapted to receive an edible filling, as a Frankfort, the steps which consist in forming pieces of dough around a series of cores, in removably supporting such cores with the adhering dough thereon within a baking pan in spaced equidistant relation to each other, and in such relation to the pan walls as to allow the cores and dough adhering thereon to rise vertically away from the pan bottom in a straight line upward lifting movement when exposed to baking heat, in exposing the same to baking heat whereby to bake the individual rolls or loaves both inside and out, in removing the cores with the baked rolls or loaves thereon from the pan, and in finally withdrawing the cores from the baked rolls or loaves.

3. Apparatus for baking an article in the form of a roll or loaf having formed therein during the process of baking a longitudinally extending opening adapted to receive an edible filling as a Frankfort, comprising a baking pan having its opposite side walls provided with a pair of alined sockets, and a core removably fitting at its ends within said sockets and about which core the dough is applied.

4. Apparatus for baking a group of connected rolls or loaves, each unit of the group having formed therein during the process of baking an opening extending therethrough from end to end and adapted to receive an edible filling as a Frankfort, comprising a baking pan having its opposite side walls provided with alined series of spaced sockets, and a plurality of detachable and interchangeable cores removably fitting at their ends within said sockets and about which cores the dough is applied.

5. In apparatus for baking hollow-center rolls or loaves, a baking pan having its opposite side walls formed to provide alined series of spaced open-topped sockets, each socket having an inwardly projecting seat forming the bottom of the socket, and a plurality of detachable and interchangeable cores about which the dough is applied and of a size and shape loosely to fit within said sockets and to have a limited vertical lifting movement during the baking process away from said seats upon which they normally rest.

6. In apparatus for baking hollow-center rolls or loaves, a baking pan having its opposite side walls formed to provide alined series of spaced open-topped sockets, each socket having an inwardly projecting seat forming the bottom of the socket, and a plurality of detachable and interchangeable cores about which the dough is applied and of a size and shape loosely to fit within said sockets and to have a limited vertical lifting movement during the baking process away from said seats upon which they normally rest, and a plurality of spaced transversely extending ribs disposed across the bottom of the pan intermediate of said sockets.

In testimony whereof, I affix my signature this eighteenth day of November, 1927.

CHARLES WEAR.